(12) United States Patent
Park et al.

(10) Patent No.: US 10,198,799 B2
(45) Date of Patent: Feb. 5, 2019

(54) METHOD AND APPARATUS FOR PROCESSING MAGNETIC RESONANCE IMAGE

(71) Applicants: SAMSUNG ELECTRONICS CO., LTD., Suwon-si (KR); KOREA ADVANCED INSTITUTE OF SCIENCE AND TECHNOLOGY, Daejeon (KR)

(72) Inventors: Hyun-wook Park, Daejeon (KR); Ki-nam Kwon, Daejeon (KR)

(73) Assignees: SAMSUNG ELECTRONICS CO., LTD., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 51 days.

(21) Appl. No.: 15/231,970

(22) Filed: Aug. 9, 2016

(65) Prior Publication Data

US 2017/0061620 A1 Mar. 2, 2017

(30) Foreign Application Priority Data

Sep. 1, 2015 (KR) .......................... 10-2015-0123654

(51) Int. Cl.
*G06K 9/00* (2006.01)
*G06T 5/50* (2006.01)
*G06T 5/00* (2006.01)

(52) U.S. Cl.
CPC ................ *G06T 5/50* (2013.01); *G06T 5/001* (2013.01); *G06T 2207/10088* (2013.01);
(Continued)

(58) Field of Classification Search
CPC ................. A61B 5/055; A61B 5/7264; G06T 2207/10088; G06T 7/0012; G06K 2209/051
(Continued)

(56) References Cited

U.S. PATENT DOCUMENTS

| 6,841,998 | B1 | 1/2005 | Griswold |
| 7,375,523 | B1 | 5/2008 | Hancu |
| 8,232,800 | B2 | 7/2012 | Park et al. |
| 8,345,940 | B2* | 1/2013 | Mattiuzzi ............... G06F 19/321 |
| | | | 382/128 |
| 8,886,283 | B1* | 11/2014 | Chen ...................... A61B 5/055 |
| | | | 382/128 |
| 9,229,079 | B2 | 1/2016 | Park et al. |

(Continued)

FOREIGN PATENT DOCUMENTS

| JP | 2010-200881 A | 9/2010 |
| KR | 10-2010-0097858 A | 9/2010 |

(Continued)

OTHER PUBLICATIONS

Dr Bruno Di Muzio and Dr Usman Bashir et al., "Gradient echo sequences", Radiology Reference Article, Radiopaedia.org, Retrieved from URL: http://radiopaedia.org/articles/gradient-echo-equences-1 on Apr. 18, 2016 (5 Pages Total).

(Continued)

*Primary Examiner* — Charlotte M Baker
(74) *Attorney, Agent, or Firm* — Sughrue Mion, PLLC

(57) ABSTRACT

Provided are a method and apparatus for reconstructing a magnetic resonance (MR) image based on a structural similarity among a plurality of MR images having different contrasts. According to the method and apparatus, acceleration, high resolution imaging, quantification of parameters, and acquisition of an MR image having a new contrast are achievable by reconstructing the plurality of MR images by using a learning process via an artificial neural network (ANN) model.

16 Claims, 14 Drawing Sheets

(52) U.S. Cl.
CPC ............ *G06T 2207/20021* (2013.01); *G06T 2207/20081* (2013.01); *G06T 2207/20084* (2013.01); *G06T 2207/30016* (2013.01)

(58) Field of Classification Search
USPC ................................. 382/131, 128; 600/410
See application file for complete search history.

(56) References Cited

U.S. PATENT DOCUMENTS

| | | | |
|---|---|---|---|
| 9,256,965 | B2* | 2/2016 | Han ......................... G06T 7/337 |
| 9,370,316 | B2* | 6/2016 | Ewing ................... A61B 5/7267 |
| 9,710,910 | B2* | 7/2017 | Kim ........................... G06T 7/33 |
| 2010/0198054 | A1 | 8/2010 | Ewing et al. |

FOREIGN PATENT DOCUMENTS

| | | |
|---|---|---|
| KR | 10-1030676 B1 | 4/2011 |
| KR | 10-2011-0049570 A | 5/2011 |
| KR | 10-2013-0045544 A | 5/2013 |
| KR | 10-2013-0071572 A | 7/2013 |

OTHER PUBLICATIONS

Dr Tim Luijkx and Dr Usman Bashir et al, "Echo planar imaging", Radiology Reference Article, Radiopaedia.org, Retrieved from URL: http://radiopaedia.org/articles/echo-planar-imaging-1 on Apr. 18, 2016 (5 Pages Total).

Klaas P. Pruessmann et al., "SENSE: Sensitivity Encoding for Fast MRI", Magnetic Resonance in Medicine 42, Wiley-Liss, Inc., (1999) pp. 952-962.

Mark A. Griswold et al., "Generalized Autocalibrating Partially Parallel Acquisitions (GRAPPA)", Magnetic Resonance in Medicine 47, Wiley-Liss, Inc., (2002) pp. 1202-1210 DOI 10.1002/mrm.10171.

Michael Lustig et al., "Sparse MRI: The Application of Compressed Sensing for Rapid MR Imaging", Magnetic Resonance in Medicine 58, Compressed Sensing MRI, Wiley-Liss, Inc., (2007) pp. 1182-1195, Published Oct. 29, 2007 DOI 10.1002/mrm.21391.

Communication dated Jun. 15, 2016, issued by the Korean Intellectual Property Office in corresponding Korean Application No. 10-2015-0123654.

* cited by examiner

METHOD AND APPARATUS FOR PROCESSING MAGNETIC RESONANCE IMAGE

CROSS-REFERENCE TO RELATED APPLICATION

This application claims priority from Korean Patent Application No. 10-2015-0123654, filed on Sep. 1, 2015, in the Korean Intellectual Property Office, the disclosure of which is incorporated herein in its entirety by reference.

BACKGROUND

1. Field

The present disclosure relates to methods of processing a magnetic resonance (MR) image and apparatuses for performing the methods.

2. Description of the Related Art

A magnetic resonance imaging (MRI) apparatus uses a magnetic field to capture an image of a target object. The MRI apparatus is widely used to obtain an accurate disease diagnosis because stereoscopic images of bones, lumbar discs, joints, nerve ligaments, the heart, etc. can be obtained at desired angles. The main feature of MR imaging is the ability to obtain various image contrasts by adjusting different parameters. Accordingly, for clinical diagnosis, MR images with various contrasts are obtained for the same body area. However, doing a series of scans takes a relatively long time, which may inconvenience a patient. This may cause a patient to voluntarily or involuntarily move, which leads to degradation of an image quality and increases in medical fees. Thus, when MR images are acquired, the image acquisition time has to be shortened and the quality of reconstructed images needs to be improved.

SUMMARY

Provided are methods of processing a magnetic resonance (MR) image and apparatuses for performing the methods, whereby the image acquisition time of a plurality of MR images with multi-contrasts may be shortened and the quality of reconstructed images may be improved based on similarity among the MR images having multiple contrasts.

Additional aspects will be set forth in part in the description which follows and, in part, will be apparent from the description, or may be learned by practice of the presented exemplary embodiments.

According to an aspect of an exemplary embodiment, a method of reconstructing a plurality of MR images with multi-contrasts includes: generating a plurality of MR images having different contrasts with respect to a same part of an object; applying an artificial neural network (ANN) model, which uses the accelerated plurality of MR images as an input and provides an original MR image to be reconstructed as an output, and learning a correlation between each of the plurality of MR images and the original MR image; and reconstructing an MR image based on the plurality of generated MR images and the learned correlation via the ANN model.

The generating of the plurality of MR images may include generating the plurality of MR images by subsampling an MR signal acquired from the same part of the object and using a parallel imaging method.

The learning of the correlation may include: extracting patches, each of the patches being a set of a plurality of pixels, respectively from the plurality of MR images and the original MR image and determining a correspondence relation between the patches; and learning the correlation between the determined correspondence relation.

The learning of the correlation may include applying a Multi-layer Perceptron (MLP), the MLP being a type of the ANN model, as a learning model.

The learning of the correlation may include learning the correlation between the plurality of MR images and the original MR image by using a backpropagation method.

The method may further include acquiring noise pattern information about a geometric factor of a radio frequency (RF) coil by using a parallel imaging method, and the learning of the correlation may include learning the correlation between the plurality of MR images and the original MR image by using the noise pattern information as an input to the ANN model.

The method may further include obtaining a non-accelerated full-sampling image having a different contrast than contrasts of the plurality of MR images with respect to the same part of the object, and the learning of the correlation may include learning the correlation between the plurality of MR images and the original MR image by using the full sampling image as an input to the ANN model.

The method may further include generating an MR image with a different contrast than contrasts of the plurality of MR images by learning the correlation between the plurality of MR images and the original MR image.

The learning of the correlation may include classifying the plurality of MR images and the original MR image into a magnitude image and a phase image and learning a correlation for the magnitude image and the phase image, respectively.

According to an aspect of another exemplary embodiment, a magnetic resonance imaging (MRI) apparatus for reconstructing a plurality of MR images with multi-contrasts includes: at least one RF channel coil configured to receive an MR signal emitted from a same part of an object; an RF receiver configured to acquire the MR signal; and an image processor configured to generate a plurality of MR images having different contrasts with respect to the same part of the object, apply an ANN model, which uses the plurality of MR images as an input and provides an original MR image as an output, to learn a correlation between each of the plurality of MR images and the original MR image, and to reconstruct an MR image based on the learned correlation.

The image processor may include: an MR signal interpretation module configured to learn the correlation and reconstruct the MR image; and a memory configured to store the plurality of MR images, the original MR image, and the reconstructed MR image.

The image processor is further configured to generate the plurality of MR images by subsampling the MR signal received by the RF receiver and using a parallel imaging method.

The image processor is further configured to extract patches, each of the patches being a set of a plurality of pixels, respectively from the plurality of MR images and the original MR image, determine a correspondence relation among the patches, and learn a correlation between the determined correspondence relation.

The image processor is further configured to learn the correlation between the plurality of MR images and the original MR image by applying a Multi-layer Perceptron (MLP), the MLP being a type of the ANN model, as a learning model.

The image processor is further configured to learn the correlation between the plurality of MR images and the original MR image by using a backpropagation method.

The image processor is further configured to acquire noise pattern information about a geometric factor of the at least one RF channel coil by using a parallel imaging method.

The image processor is further configured to learn the correlation between the plurality of MR images and the original MR image by using the noise pattern information as an input to the ANN model.

The image processor is further configured to obtain a non-accelerated full-sampling image having a different contrast than contrasts of the plurality of MR images with respect to the same part of the object and learn the correlation between the plurality of MR images and the original MR image by using the full sampling image as an input to the ANN model.

The image processor is further configured to generate an MR image having a different contrast than contrasts of the plurality of MR images by learning the correlation between the plurality of MR images and the original MR image.

The image processor is further configured to classify the plurality of MR images and the original MR image into a magnitude image and a phase image and learn a correlation for the magnitude image and the phase image, respectively.

According to an aspect of another exemplary embodiment, a non-transitory computer-readable recording medium has recorded thereon a program for executing the method of reconstructing a plurality of MR images with multi-contrasts on a computer.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Figure 1A:
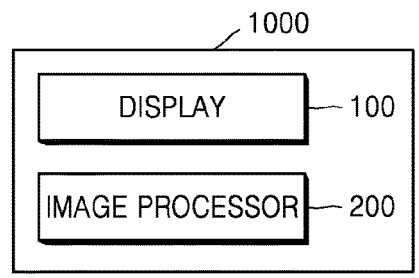
FIGS. 1A and 1B illustrate a magnetic resonance imaging (MRI) apparatus according to an exemplary embodiment.

The attached drawings for illustrating exemplary embodiments of the present disclosure are referred to in order to gain a sufficient understanding of the present disclosure, the merits thereof, and the objectives accomplished by the implementation of the present disclosure. In this regard, the present exemplary embodiments may have different forms and should not be construed as being limited to the descriptions set forth herein. Rather, these exemplary embodiments are provided so that this disclosure will be thorough and complete and will fully convey the concept of the present exemplary embodiments to one of ordinary skill in the art, and the present inventive concept will only be defined by the appended claims.

Hereinafter, the terms used in the specification will be briefly described, and then the present disclosure will be described in detail.

The terms used in this specification are those general terms currently widely used in the art in consideration of functions regarding the present disclosure, but the terms may vary according to the intention of those of ordinary skill in the art, precedents, or new technology in the art. Also, some terms may be arbitrarily selected by the applicant, and in this case, the meaning of the selected terms will be described in detail in the detailed description of the present specification. Thus, the terms used in the specification should be understood not as simple names but based on the meaning of the terms and the overall description of the exemplary embodiments.

When a part "includes" or "comprises" an element, unless there is a particular description contrary thereto, the part can further include other elements, not excluding the other elements. Also, the term "unit" in the exemplary embodiments means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

Reference will now be made in detail to exemplary embodiments, examples of which are illustrated in the accompanying drawings. In the following description, well-known functions or constructions are not described in detail so as not to obscure the exemplary embodiments with unnecessary detail. Expressions such as "at least one of," when preceding a list of elements, modify the entire list of elements and do not modify the individual elements of the list.

Throughout the specification, an "image" may denote multi-dimensional data composed of discrete image elements (for example, pixels in a two-dimensional (2D) image and voxels in a three-dimensional (3D) image). For example, the image may be a medical image of an object captured by an X-ray apparatus, a computed tomography (CT) apparatus, a magnetic resonance imaging (MRI) apparatus, an ultrasound diagnosis apparatus, or another medical imaging apparatus.

Furthermore, in the present specification, an "object" may be a human, an animal, or a part of a human or animal. For example, the object may be an organ (e.g., the liver, the heart, the womb, the brain, a breast, or the abdomen), a blood vessel, or a combination thereof. Furthermore, the "object" may be a phantom. The phantom means a material having a density, an effective atomic number, and a volume that are approximately the same as those of an organism. For example, the phantom may be a spherical phantom having properties similar to the human body.

Furthermore, in the present specification, a "user" may be, but is not limited to, a medical expert, such as a medical doctor, a nurse, a medical laboratory technologist, or a technician who repairs a medical apparatus.

Furthermore, in the present specification, an "MR image" refers to an image of an object obtained by using the nuclear magnetic resonance principle.

Furthermore, in the present specification, a "pulse sequence" refers to continuity of signals repeatedly applied by an MRI apparatus. The pulse sequence may include a time parameter of a radio frequency (RF) pulse, for example, repetition time (TR) or echo time (TE).

An MRI system is an apparatus for acquiring a sectional image of a part of an object by expressing, in a contrast comparison, a strength of a MR signal with respect to a radio frequency (RF) signal generated in a magnetic field having a specific strength. For example, if an RF signal that only resonates a specific atomic nucleus (for example, a hydrogen atomic nucleus) is emitted for an instant toward the object placed in a strong magnetic field and then such emission stops, an MR signal is emitted from the specific atomic nucleus, and thus the MRI system may receive the MR signal and acquire an MR image. The MR signal denotes an RF signal emitted from the object. An intensity of the MR signal may be determined according to a density of a predetermined atom (for example, hydrogen) of the object, a relaxation time T1, a relaxation time T2, and a flow of blood or the like.

MRI systems include characteristics different from those of other imaging apparatuses. Unlike imaging apparatuses such as CT apparatuses that acquire images according to a direction of detection hardware, MRI systems may acquire 2D images or 3D volume images that are oriented toward an optional point. MRI systems do not expose objects or examiners to radiation, unlike CT apparatuses, X-ray apparatuses, position emission tomography (PET) apparatuses, and single photon emission CT (SPECT) apparatuses, may acquire images having high soft tissue contrast, and may acquire neurological images, intravascular images, musculoskeletal images, and oncologic images that are required to precisely capturing abnormal tissues.

Furthermore, in the present specification, the terms "first", "second", "1-1", etc. are only used to distinguish one component, element, image, pixel, or patch from another component, element, object, image, pixel, or patch. Thus, these terms are not limited to representing the order or priority among elements or components.

FIG. 1A illustrate an MRI apparatus 1000 according to an exemplary embodiment.

The MRI apparatus 1000 may include a display 100 and an image processor 200.

The image processor 200 may process an MR signal emitted from an object to thereby generate MR data with respect to the object.

The image processor 200 receives the MR signal via an RF receiver and performs any one of various signal processes, such as amplification, frequency transformation, phase detection, low frequency amplification, and filtering, on the received MR signal.

For example, the image processor 200 may arrange digital data in a k space (e.g., also referred to as a Fourier space or a frequency space) of a memory (not shown), and rearrange the digital data into image data via 2D or 3D Fourier transformation.

The image processor 200 may perform a composition process or difference calculation process on the image data. The composition process may include an addition process on a pixel or a maximum intensity projection (MIP) process. According to an exemplary embodiment, the image processor 200 may generate a plurality of MR images having different contrasts by accelerating an MR signal received by the RF receiver and apply an artificial neural network (ANN) model that uses the plurality of MR images as an input and provides an original MR image generated by full sampling as an output to thereby learn a correlation between the plurality of MR images and the original MR image. The image processor 200 may also reconstruct an MR image based on the learned correlation or generate a new MR image having a different contrast. The image processor 200 may store not only reconstructed, generated, or rearranged image data but also image data on which a composition process or a difference calculation process is performed, in the memory or an external server.

Furthermore, the image processor 200 may perform any of the signal processes on the MR signal in parallel. For example, the image processor 200 may perform a signal process on a plurality of MR signals received by a multi-channel RF coil in parallel so as to rearrange the plurality of MR signals into image data.

The display 100 may display MR images generated or reconstructed by the image processor 200 to the user. Furthermore, the display 100 may display a graphical user interface (GUI) as well as information necessary for the user to manipulate an MRI system such as user information or object information.

Figure 1B:
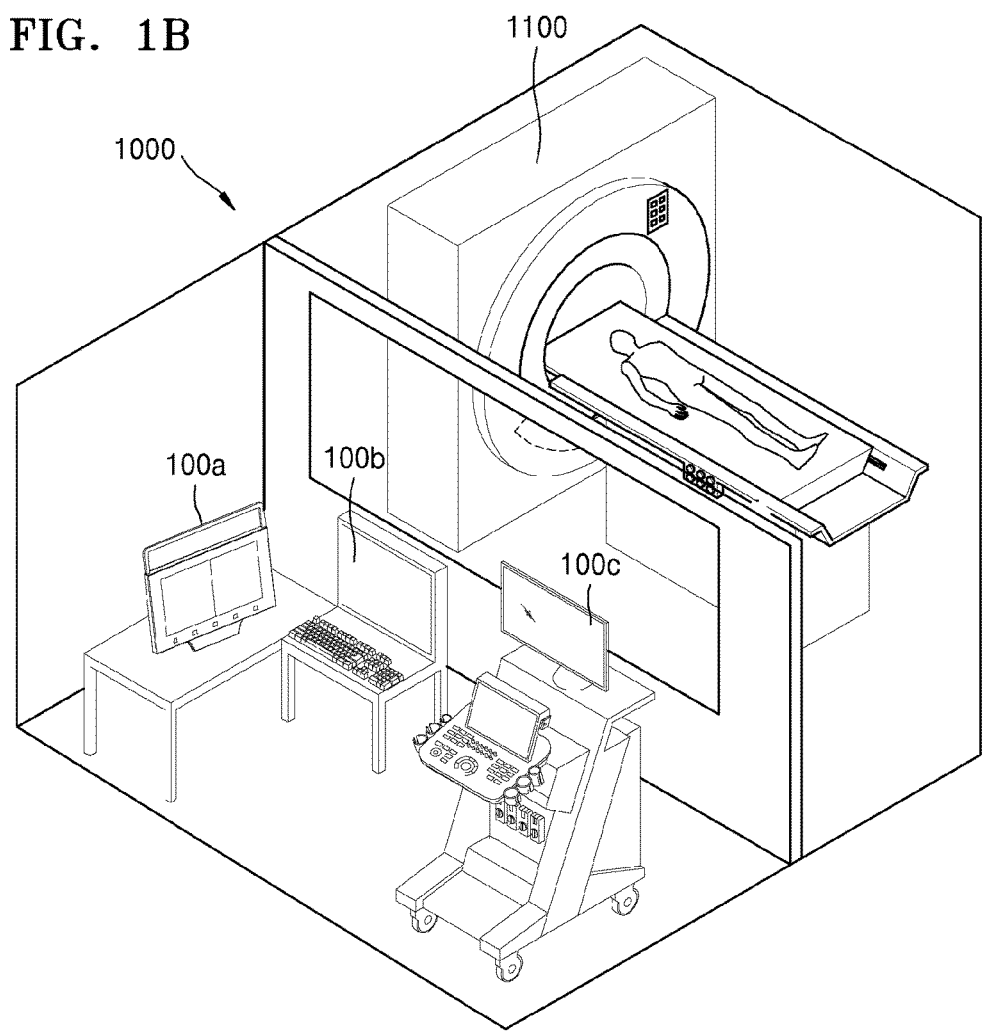

FIG. 1B illustrates an MRI apparatus 1000 according to an exemplary embodiment.

The MRI apparatus 1000 according to the present exemplary embodiment may include a measuring unit (also referred to herein as a "measurer") 1100 and displays 100a, 100b, and 100c.

To generate an image of an object, the measuring unit 1100 may apply an MR signal to the object and receive an MR signal from the object. The measuring unit 1100 may include a gantry including a main magnet, a gradient coil, an RF coil, etc. For example, the measuring unit 1100 may include the image processor 200 as described above with reference to FIG. 1.

The displays 100a, 100b, and 100c each may receive an MR image generated by the measuring unit 1100 and display the MR image via various GUIs.

Figure 2:
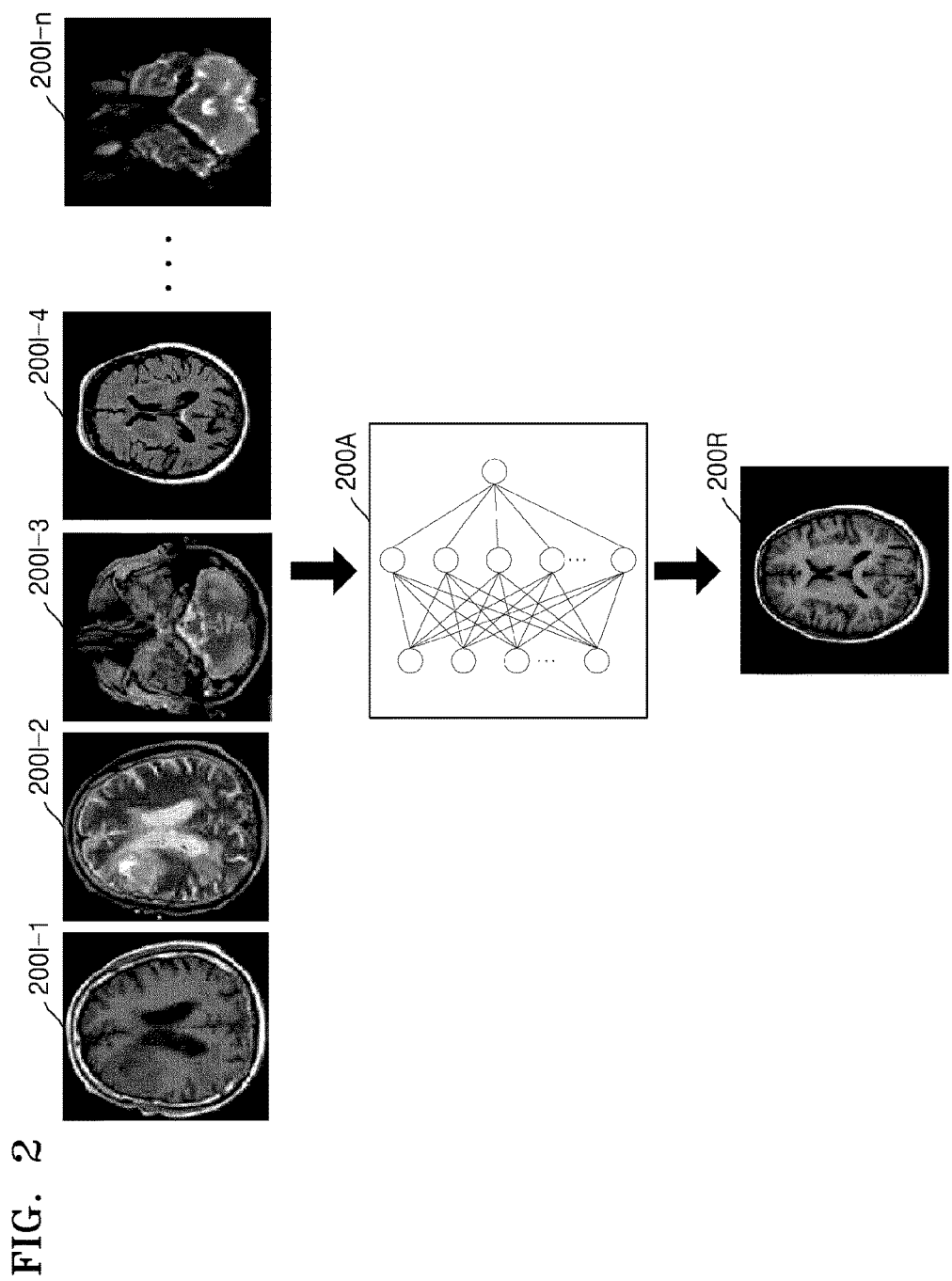
FIG. 2 is a conceptual diagram for explaining a method of processing an MR image according to an exemplary embodiment.

FIG. 2 is a conceptual diagram for explaining a method of processing an MR image according to an exemplary embodiment.

Referring to FIG. 2, the method may include accelerating and generating a plurality of MR images 200I-1 through 200I-n having different contrasts, applying an ANN model 200A that uses the plurality of MR images 200I-1 through 200I-n as an input and provides an original MR image 200R obtained by full sampling as an output to thereby learn a correlation between the plurality of MR images 200I-1 through 200I-n and the original MR image 200R, and reconstructing an MR image based on the correlation therebetween.

The plurality of MR images 200I-1 through 200I-n may be MR images having different contrasts for the same part of an object. Although FIG. 2 shows a total of five (5) multi-contrast images, the exemplary embodiment is merely an example, and the plurality of MR images 200I-1 through 200I-n may include two or more images. For example, the plurality of MR images 200I-1 through 200I-n having multi-contrasts may include any of a T1-weighted (T1W) image, a T1-weighted contrast-enhanced (T1CE) image, a T2-weighted (T2W) image, a fluid-attenuated image inversion-recovery (FLAIR) image, a diffusion-weighted (DW) image, and a proton density weighted (PDW) image. According to an exemplary embodiment, the first through fourth MR images 200I-1 through 200I-4 may respectively be T1W, T2W, T2CE, and FLAIR images, and the n-th MR image may be a DW image. However, the plurality of MR images, i.e., the first through n-th MR images 200I-1 through 200I-n, are not limited to the above-described multi-contrast images.

According to an exemplary embodiment, the plurality of MR images 200I-1 through 200I-n may be accelerated images obtained by subsampling multi-contrast k-space data with respect to the object and acquired via an RF coil. However, all of the plurality of MR images 200I-1 through 200I-n may not be accelerated images, and at least one of them may be a non-accelerated image obtained by fully sampling k-space data.

The plurality of MR images 200I-1 through 200I-n may be used as an input to the ANN model 200A. The ANN model 200A is a statistical learning algorithm that learns a correlation between the plurality of MR images 200I-1 through 200I-n and an original MR image (e.g., 200RI of FIG. 4A) obtained by fully sampling multi-contrast k-space data with respect to the object by using the plurality of MR images 200I-1 through 200I-n as an input and the original MR image 200RI as an output. According to an exemplary embodiment, the ANN model 200A may be based on a backpropagation algorithm that estimates an approximate value during a process of calculating an output based on a plurality of inputs, reduces an error rate between the approximate value and the output, and extracts a function mapping an input to an output. According to an exemplary embodiment, the ANN model 200A may use a Multi-layer Perceptron (MLP) as a learning model. The ANN model 200A will be described in more detail below with reference to FIGS. 4A and 4B.

As a result of learning via the ANN model 200A, the original MR image 200R may be reconstructed. The original MR image 200R may be an MR image having the same contrast as one of the plurality of MR images 200I-1 through 200I-n fed as an input to the ANN model 200A. However, exemplary embodiments are not limited thereto, and the original MR image 200R may have a different contrast than each of the plurality of MR images 200I-1 through 200I-n.

A general MR image acquisition method may require a relatively long scanning time and a relatively large cost. The MR image acquisition time may be shortened by acquiring signals faster or obtaining fewer signals than required to reconstruct an image. Acquiring signals faster may depend on the performance of hardware components of an MRI apparatus and may be significantly affected by parameters such as repetition time (TR) or echo time (TE). Thus, this method has a limitation in obtaining an image having a desired contrast. Furthermore, parallel imaging, one of the methods for obtaining fewer signals than required, may provide excellent performance at a low acceleration factor but may cause degradation of image quality at a high acceleration factor due to a coil sensitivity profile. A compressed sensing based method is a technique for reconstructing a signal by using prior knowledge information of the signal such as signal sparsity. However, this method uses a non-linear reconstruction algorithm, and thus may require a relatively long image reconstruction time.

According to the exemplary embodiment shown in FIG. 2, the plurality of MR images 200I-1 through 200I-n having different contrasts are generated by accelerating k-space data at a high acceleration factor, and similarity among the plurality of MR images 200I-1 through 200I-n and the correlation between the plurality of MR images 200I-1 through 200I-n and the original MR image 200R are learned via the ANN model 200A, thereby shortening the total image acquisition time and improving the quality of a reconstructed image.

Figure 3:
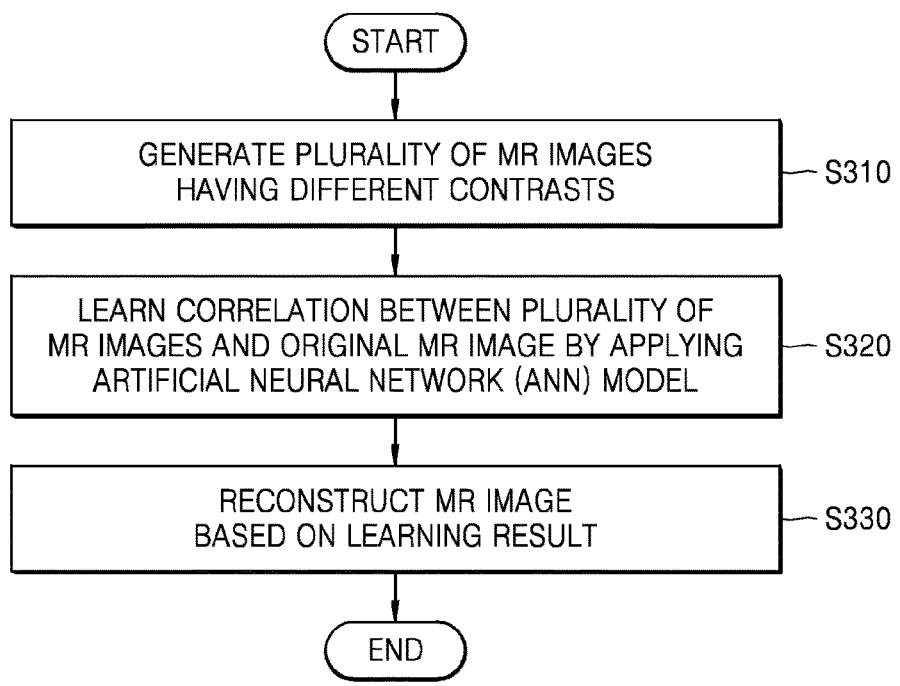
FIG. 3 is a flowchart of a method of processing an MR image according to an exemplary embodiment.

FIG. 3 is a flowchart of a method of processing an MR image according to an exemplary embodiment.

A plurality of MR images having different contrasts are generated (operation S310). The plurality of MR images having different contrasts may be obtained for the same object by using different protocols. For example, the plurality of MR images may include T1W, T2CE, T2W, FLAIR, DW, and PDW images.

A correlation between the plurality of MR images and an original MR image is learned by applying an ANN model (operation S320). According to an exemplary embodiment, the plurality of MR images may be accelerated images obtained by subsampling k-space data. By using the accelerated plurality of MR images as an input and the original MR image obtained by fully sampling k-space data as an output, the ANN model may learn the correlation between the plurality of MR images and the original MR image. According to an exemplary embodiment, the ANN model may learn the correlation therebetween by using a back-propagation method. In one embodiment, at least one of the plurality of MR images used as an input to the ANN model may not be an accelerated image but be an image obtained by full sampling at the Nyquist sampling rate.

An MR image is reconstructed based on a learning result (operation S330). The reconstructed MR image may have the same contrast as one of the plurality of MR images fed as an input to the ANN model, but is not limited thereto.

Figure 4A:
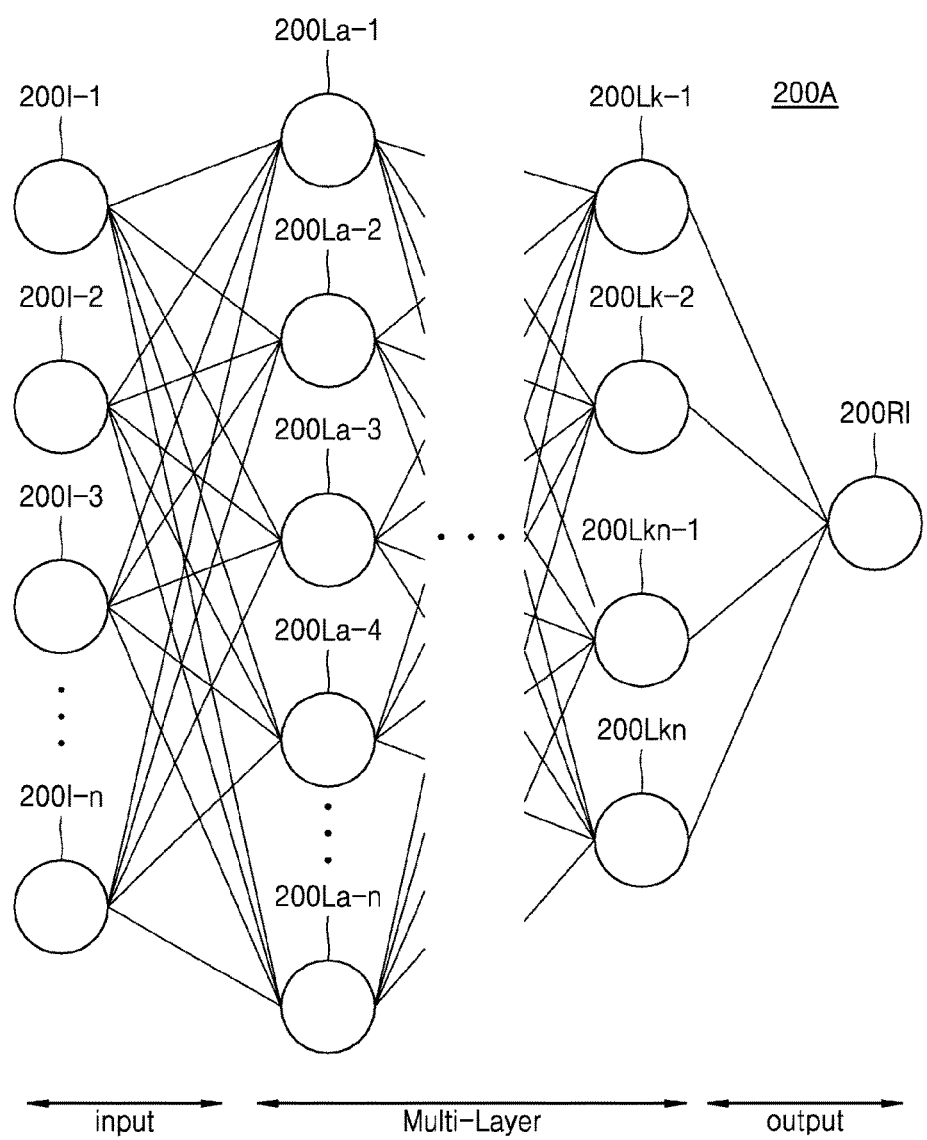
FIGS. 4A and 4B are diagrams for explaining a method of processing an MR image according to an exemplary embodiment.
Figure 4B:
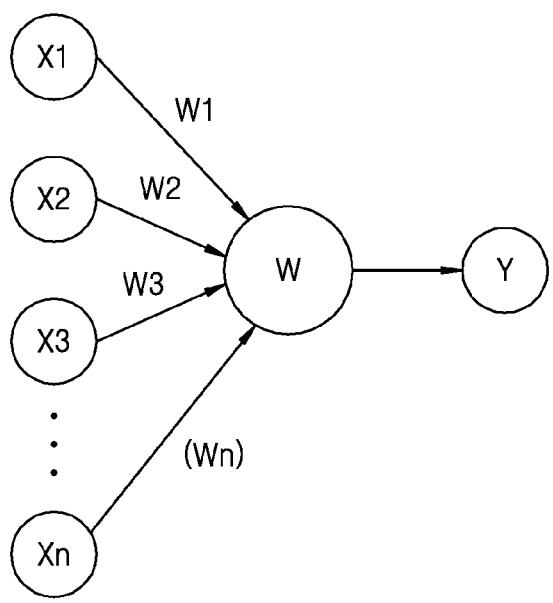

FIGS. 4A and 4B are detailed diagrams for explaining an ANN model 200A used in a method of processing an MR image according to an exemplary embodiment.

Referring to FIG. 4A, in the ANN model 200A, a plurality of MR images 200I-1 through 200I-n may be used as an input, and an original MR image 200RI may be provided as an output. The ANN model 200A may include intermediate layers arranged in k multi-layer structures between input and output. In the k multi-layer structures, a plurality of artificial neurons 200La-1 through 200La-n and a plurality of artificial neurons 200Lk-1 through 200Lk-n respectively include n artificial neurons. According to an exemplary embodiment, the ANN model 200A may be an MLP.

Patches are extracted respectively from the plurality of MR images 200I-1 through 200I-n used as an input and the original MR image 200RI used as an output, and a correlation between corresponding patches in the plurality of MR images and the original MR image 200RI may be learned via the ANN model 200A. In this case, each patch may be a set of pixels. An example in which patches are extracted from MR images and applied to the ANN model 200A will be described in more detail below with reference to FIGS. 6A, 6B, and 6C.

The plurality of artificial neurons 200La-1 through 200La-n and a plurality of artificial neurons 200Lk-1 through 200Lk-n in the intermediate layers of the ANN model 200A, the inputs, and the output may be interconnected to each other via interconnection networks. Each interconnection network may have a specific weight. Weights may be estimated values estimated that maximize a similarity among the plurality of MR images 200I-1 through 200I-n used as an input and the original MR image 200RI used as an output. The weights respectively assigned to the interconnection networks may be modified according to a learning result. FIG. 4B illustrates an example in which weights W1 through Wn are respectively applied to the interconnection networks while a plurality of inputs X1 through Xn to an ANN model is propagated to an output Y through an artificial neuron W. Referring to FIG. 4B, a first input X1 from among the plurality of inputs X1 through Xn may be assigned a first weight W1 and transmitted to the artificial neuron W, the second input X2 may be assigned a second weight W2 and transmitted to the artificial neuron W, and an n-th input Xn may be assigned an n-th weight Wn and transmitted to the artificial neuron W. Each of the weights W1 through Wn may be determined to optimally approximate each of the plurality of inputs X1 through Xn to the output Y and may be adjusted during a learning process.

Referring back to FIG. 4A, the ANN model 200A may perform learning by using an algorithm in which the plurality of artificial neurons 200La-1 through 200La-n and 200Lk-1 through 200Lk-n arranged between the input and output optimize an estimated value of an output corresponding to an input. According to an exemplary embodiment, the plurality of MR images 200I-1 through 200I-n used as an input and the original MR image 200RI provided as an output are respectively extracted in the time domain on a pixel-by-pixel or patch-by-patch basis, and brightness, color information, or contrast rate of an image in the time domain are quantified into numerical values. Learning may be performed by estimating and computing a weight being applied to each interconnection network. The weight may be iteratively changed via adjustment ("weight adjustment") as learning via the ANN model 200a continues. A value of the adjusted weight may be determined to optimally approximate the plurality of MR images 200I-1 through 200I-n used as an input to the original MR image 200RI used as an output.

According to an exemplary embodiment, learning via the ANN model 200A may be performed by estimating a difference between each of the plurality of MR images 200I-1 through 200I-n and the original MR image 200RI respectively used as an input and output, minimizing an error rate due to the difference, and approximating the input to the output. In other words, a backpropagation method may be used for learning via the ANN model 200A. According to the backpropagation method, a value that optimizes an output corresponding to an input is calculated as a weight being applied to an interconnection network during learning, the learning is performed backwards based on the calculated value, and the weight of the interconnection network is updated. After n learning iterations, an optimized weight may be obtained.

Figure 5:
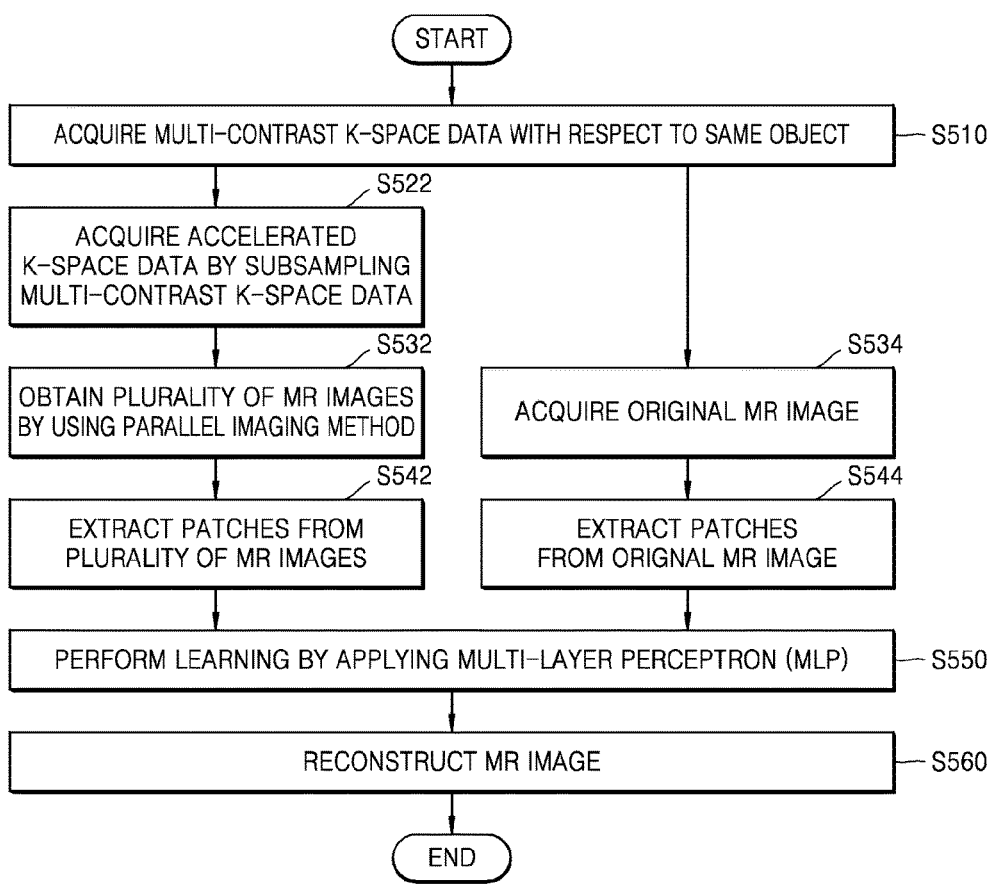
FIG. 5 is a flowchart of a method of reconstructing an MR image according to an exemplary embodiment.

FIG. 5 is a flowchart of a method of reconstructing an MR image according to an exemplary embodiment.

K-space data having multi-contrasts with respect to the same object are acquired (operation S510). An RF receiver (e.g., 210 of FIG. 11) of an image processor (e.g., 200 of FIG. 11) may process an MR signal received from the same part of the object via an RF coil to thereby generate MR image data with respect to the object. The image processor 200 may arrange digital data in a k space and rearrange the digital data into image data via 2D or 3D Fourier transformation Accelerated k-space data are acquired by subsampling the k-space data having multi-contrasts (operation S522). Subsampling is performed at a rate less than a Nyquist sampling rate, and some of data in a data set may not be acquired during the subsampling. In this aspect, sample lines in the k-space may include a missing line where digital data is not acquired. Repetition time (TR) is required to acquire digital data in one sample line. However, since subsampling does not require TR for acquiring a missing line, the time required to scan an object may be reduced. For example, if subsampling is performed at an interval between sample lines, which is twice an interval for full sampling, two-fold accelerated k-space data may be acquired. In the above example, the amount of the two-fold accelerated k-space data is only about one half of the fully sampled data.

A plurality of MR images may be obtained using a parallel imaging method (operation S532). Some examples of parallel imaging methods are image-based sensitivity encoding (SENSE) for fast MRI and k-space-based generalized autocalibrating partially parallel acquisitions (GRAPPA). The image processor 200 may determine a correlation between a plurality of sub-data sets by using a parallel imaging method and obtain a plurality of MR images. For this purpose, the image processor 200 may acquire additional data. Through a calibration measurement process for measuring a k-space position where data from a data set are mapped, calibration data that is additional data may be acquired. According to an exemplary embodiment, the image processor 200 may acquire calibration data in each sub-data set via calibration by using GRAPPA, and estimate missing data in a missing line based on sample lines where digital data from each sub-data set are acquired and the calibration data.

An original MR image is obtained by fully sampling the k-space data having multi-contrasts (operation S534). Full sampling refers to a sampling method that satisfies the Nyquist sampling theorem and allows acquisition of all data sets unlike subsampling.

Patches are extracted from each of the plurality of MR images (operation S542). Each patch may be a set of pixels in an MR image. According to an embodiment, one patch may be a set of 5 by 5 (i.e., 5×5) pixels. Each of the plurality of MR images may be extracted on a patch basis (i.e., 5×5 pixels) and may be classified into a plurality of patches.

Patches are extracted from the original MR image (operation S544). According to an exemplary embodiment, the original MR image may be extracted on a per patch basis (5×5 pixels) and classified into a plurality of patches. Extraction of patches will be described in more detail below with reference to FIGS. 6A, 6B, and 6C.

A correlation between the plurality of MR images and the original MR image is learned using an MLP algorithm (operation S550). The MLP algorithm may be an ANN model that uses the plurality of MR images 200I-1 through 200I-n as an input and provides the original MR image 200RI as an output as shown in FIG. 4A. Learning of the correlation via a MLP model may be performed by the image processor 200. According to an exemplary embodiment, the image processor 200 may determine a correspondence relation between the patches from the plurality of MR images and from the original MR image respectively extracted in operation S542 and S544. The image processor 200 may learn a correlation between corresponding patches by applying the MLP algorithm based on the determined correspondence relation. In one exemplary embodiment, the image processor 200 may classify the plurality of MR images and the original MR image into a magnitude image and a phase image and learn a correlation for the magnitude image and the phase image, respectively.

An MR image is reconstructed (operation S560). The image processor 200 may reconstruct an MR image having the same contrast as some of the plurality of MR images 200I-1 through 200I-n used as an input to the MLP algorithm. According to an exemplary embodiment, the image processor 200 may reconstruct an MR image having a different contrast than those of the plurality of MR images 200I-1 through 200I-n.

The method of processing an MR image according to the above-described exemplary embodiment may improve the quality of a reconstructed image while increasing acceleration by using redundant information, based on a structural similarity between the plurality of MR images having different contrasts. According to an exemplary embodiment, by reconstructing the plurality of MR images using a learning process via an ANN model, it is possible to allow acceleration, high resolution imaging, quantification of parameters, and acquisition of an MR image having a new contrast.

Figure 6A:
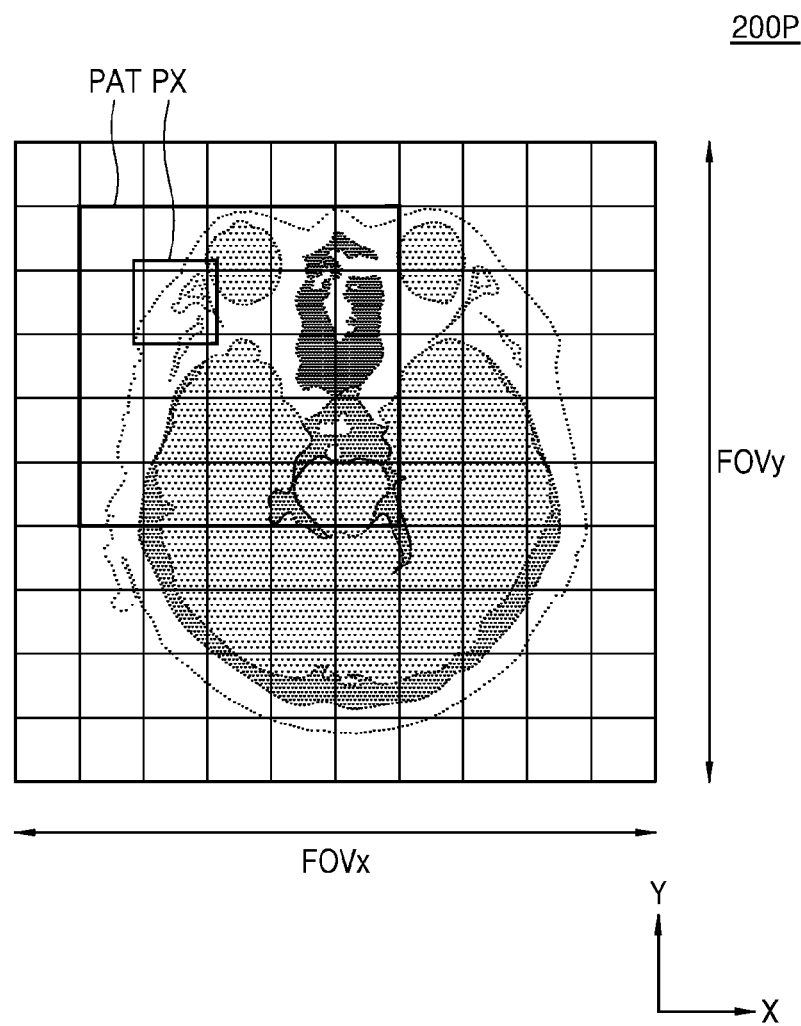
FIGS. 6A, 6B, and 6C are diagrams for explaining an operation of a method of processing an MR image according to an exemplary embodiment.
Figure 6B:
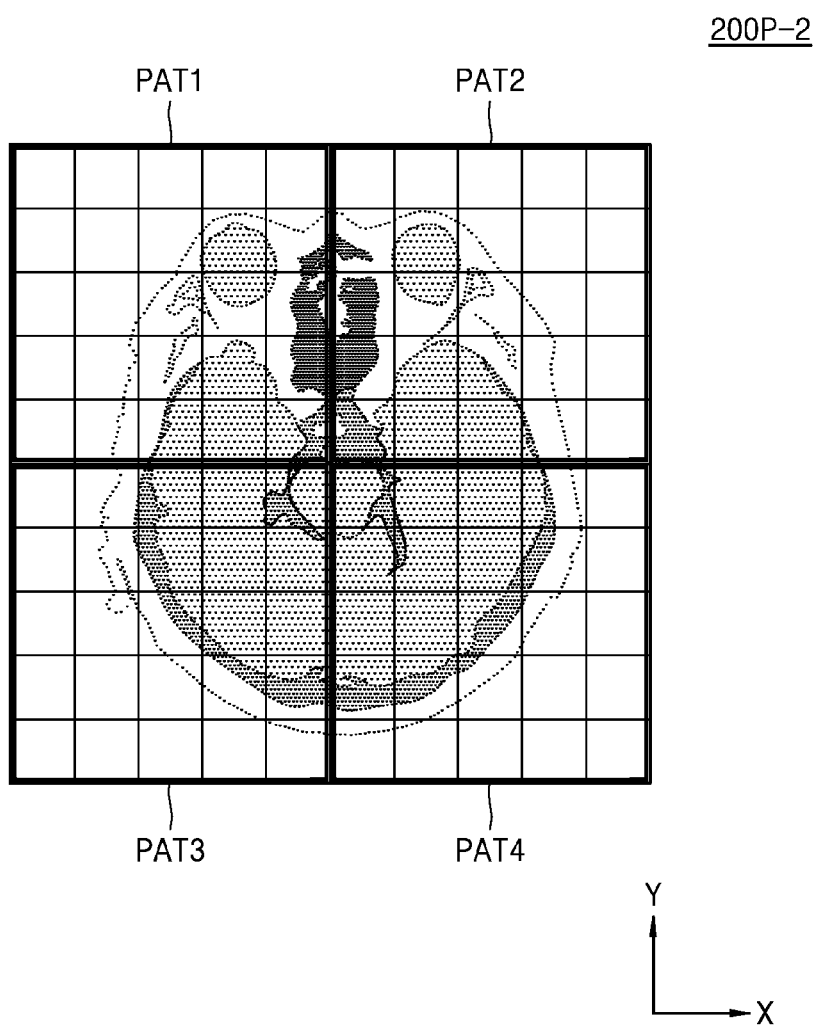
Figure 6C:
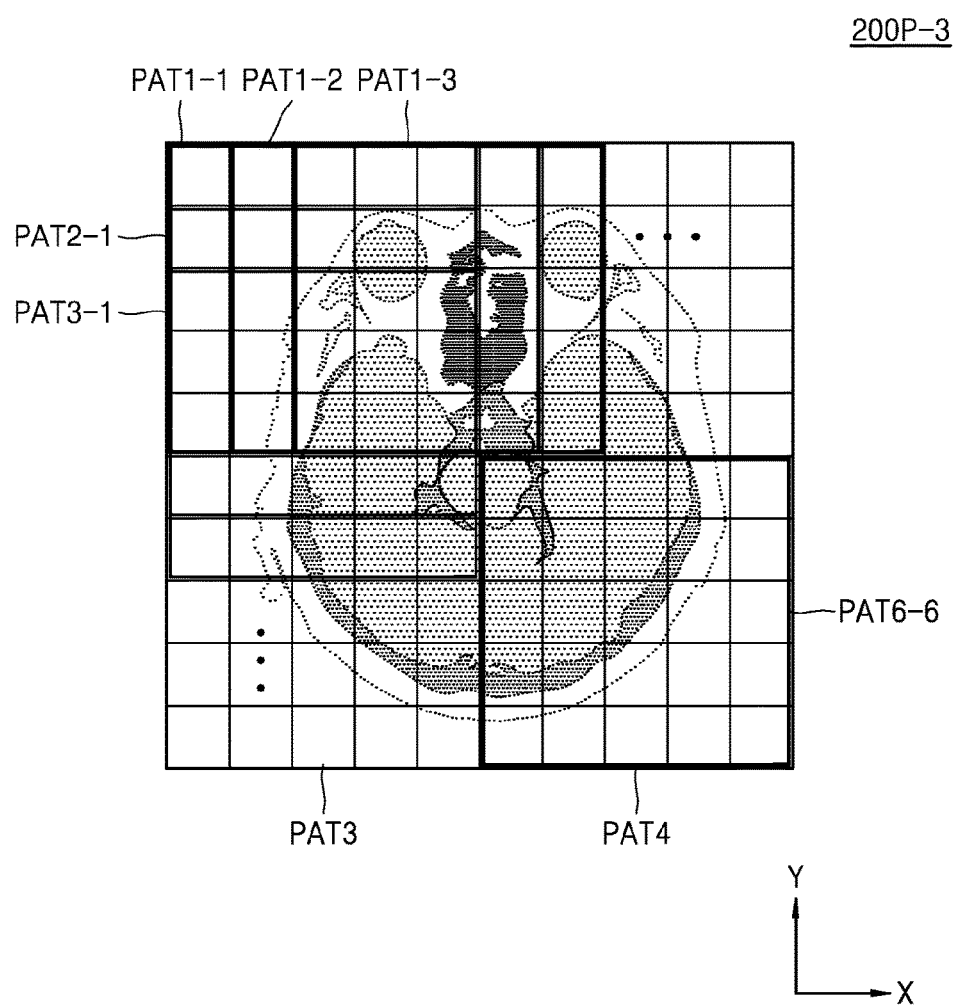

FIGS. 6A, 6B, and 6C are diagrams for explaining an operation of a method of processing an MR image according to exemplary embodiments.

FIG. 6A illustrates a field of view (FOV) in an MR image 200P, which defines an image space in the time domain. Referring to FIG. 6A, the MR image 200P may include a plurality of pixels PX arranged in a matrix. The resolution of the MR image 200P may be defined as the number of pixels PX within the FOV or a size of the matrix of the pixels PX. According to an exemplary embodiment, the MR image 200P may have a resolution of 10 by 10 (10×10) pixels. A patch PAT may be composed of a set of a plurality of pixels PX. According to an exemplary embodiment, the patch PAT may be a set of 5 by 5 (5×5) pixels. However, the resolution of the MR image 200P and a size of a patch PAT in the MR image 200P are not limited to the above numerical values.

FIGS. 6B and 6C illustrate learning of a correlation performed by the image processor (e.g., 200 of FIG. 11) via an ANN model, according to exemplary embodiments. FIGS. 6B and 6C show methods of extracting patches from an MR image 200P-2 (200P-3) and mapping corresponding patches to each other.

Referring to FIG. 6B, the MR image 200P-2 may have a resolution of 10 by 10 (10×10) pixels. According to an exemplary embodiment, each of a plurality of patches PAT1 through PAT4 may be a set of 5 by 5 (5×5) pixels. The MR image 200P-2 may be made up of a total of four patches including first through fourth patches PAT1 through PAT4. Each of the first through fourth patches PAT1 through PAT4 is applied to the ANN model so that its correlation with a corresponding patch in another MR image may be obtained by learning.

Referring to FIG. 6C, the MR image 200P-3 may have a resolution of 10 by 10 (10×10) pixels, and include a plurality of patches 1-1 through 6-6 PAT1-1 through PAT6-6. According to an exemplary embodiment, each of the plurality of patches 1-1 through 6-6 PAT1-1 through PAT6-6 may be a set of 5 by 5 (5×5) pixels. Patch 1-2 PAT1-2 may overlap patch 1-1 PAT1-1 with an interval of one pixel therebetween in a second (Y) direction. Similarly, patch 2-1 PAT2-1 may overlap patch 1-1 PAT1-1 with an interval of one pixel therebetween in a first (X) direction. In this way, when the remaining pixels in each of the plurality of patches 1-1 through 6-6 PAT1-1 through PAT6-6 are extracted to overlap pixels in an adjacent patch with the interval of one pixel therebetween in the first (X) or second (Y) direction, a total of 36 patches may be extracted. According to an exemplary embodiment, the image processor 200 may extract the plurality of patches 1-1 through 6-6 PAT1-1 through PAT6-6 (i.e. 36 patches) from the MR image 200P-3, extract a total of 36 patches from each of the other MR images used as an input to the ANN model and the original MR image used as an output, determine a correspondence relation between corresponding patches, and obtain a learnt correlation therebetween based on the determined correspondence relation. Furthermore, when some of the plurality of pixels in the MR image 200P-3 are extracted to overlap in at least two patches, the overlapping pixels may be applied to the ANN model by adding together numerical values of the overlapping pixels in each patch and calculating an average value by dividing the resulting sum by the number of overlaps.

Similarly as in the exemplary embodiment shown in FIG. 6B, according to the exemplary embodiment shown in FIG. 6C, the MR image 200P-3 has a resolution of 10 by 10 (10×10) pixels, and patches in the MR image 200P-3 are applied to the ANN model. However, unlike in the method described with reference to FIG. 6B, according to the method described with reference to FIG. 6C, a correlation is calculated by extracting the plurality of patches 1-1 through 6-6 PAT1-1 through PAT6-6 so that pixels therein overlap one another. Thus, use of the method of FIG. 6C provides reconstructed image with higher quality compared to the use of the method of FIG. 6B.

Figure 7:
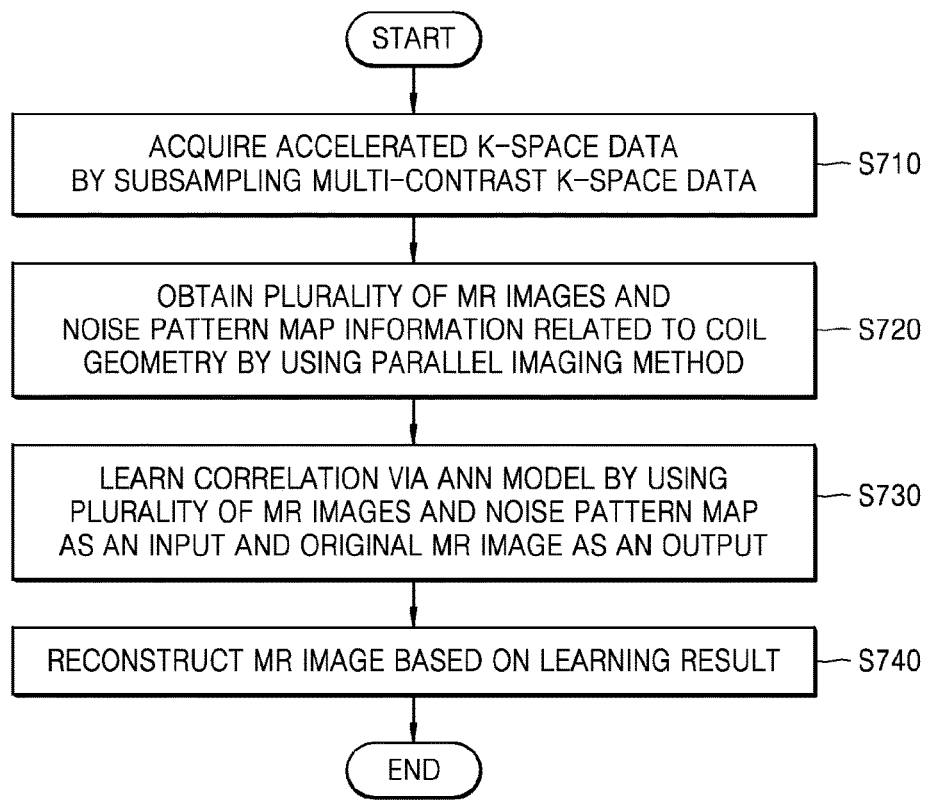
FIG. 7 is a flowchart of a method of reconstructing an MR image according to an exemplary embodiment.

FIG. 7 is a flowchart of a method of reconstructing an MR image according to an exemplary embodiment.

Accelerated k-space data is acquired by subsampling k-space data having multi-contrasts with respect to the same object (operation S710). Since a method of acquiring accelerated k-space data by subsampling k-space data having multiple contrasts is performed in the same manner as in operations S510 and S522 described with reference to FIG. 5, descriptions already provided with reference to FIG. 5 will be omitted here.

A plurality of MR images and information about a noise pattern map related to a coil geometry are obtained by using a parallel imaging method (operation S720). Each of the plurality of MR images generated by the parallel imaging method may have a noise pattern that varies across the MR image. According to an exemplary embodiment, noise pattern information may include noise pattern map information about a geometric factor (g-factor) of an RF coil, which is acquired by using a SENSE parallel imaging method. For example, the g-factor of an RF coil may include a position and sensitivity information of the RF coil.

A correlation is learned by using an ANN model that uses the plurality of MR images and the noise pattern map as an input and provides an original MR image as an output (operation S730). According to an exemplary embodiment, the noise pattern map may be used as an input to the ANN model. Referring to FIG. 4A, one of the plurality of MR images 200I-1 through 200I-n may be replaced by the noise pattern map. However, the exemplary embodiments are not limited thereto, and the noise pattern map as well as the plurality of MR images 200I-1 through 200I-n may be used as an input to the ANN model. According to an exemplary embodiment, the ANN model may be an MLP model, and a noise pattern map may be used as an input to the MLP model.

An MR image is reconstructed based on a result of learning via the ANN model (operation S740).

According to the method of FIG. 7, not only the plurality of MR images obtained by accelerating the k-space data that have multiple contrasts but also the noise pattern map obtained by using a g-factor of an RF coil may be used as an input to the ANN model in order to learn a correlation among the plurality of MR images, the noise pattern map, and the original MR image, and an MR image may be reconstructed based on the learned correlation. Thus, the method of FIG. 7 according to the present exemplary embodiment may further improve the quality of a reconstructed image based on information about a varying noise pattern.

Figure 8:
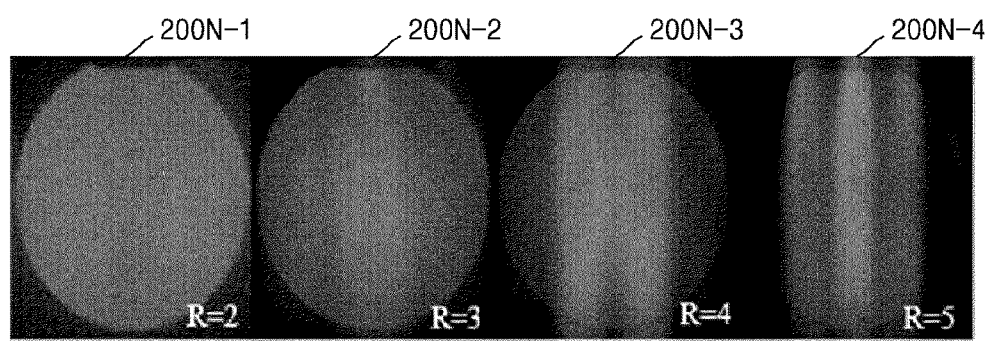
FIG. 8 illustrates a noise pattern map according to an exemplary embodiment.

FIG. 8 illustrates a plurality of noise pattern maps 200N-1 through 200N-4 according to an exemplary embodiment.

Referring to FIG. 8, the plurality of noise pattern maps 200N-1 through 200N-4 have different noise patterns that vary based on an acceleration factor. A first noise pattern map 200N-1 may be noise pattern information obtained when sampling is performed at an acceleration factor of R=2. Similarly, second through fourth noise pattern maps 200N-2 through 200N-4 may be noise pattern information respectively obtained when sampling is performed at acceleration factors R=3, R=4, and R=5.

According to an exemplary embodiment, a noise pattern map having the same acceleration factor as that of an MR image from among the first through fourth noise pattern maps 200N-1 through 200N-4 may be used as an input to an ANN model. For example, if the plurality of MR images are subsampled at an acceleration factor of R=2, the first noise pattern map 200N-1 may be used as an input to the ANN model, together with the plurality of MR images. By applying a noise pattern map to the ANN model, the quality of a reconstructed image may be improved.

Figure 9A:
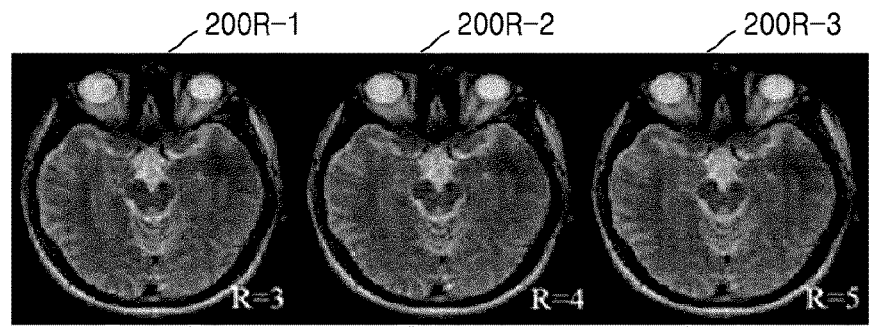
FIG. 9A illustrates MR images reconstructed by using a method of processing an MR image according to an exemplary embodiment.
Figure 9B:
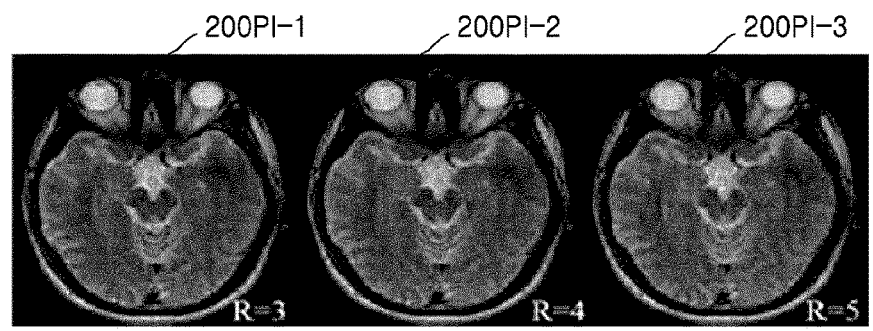
FIG. 9B illustrates MR images reconstructed by using a parallel imaging technique.
Figure 9C:
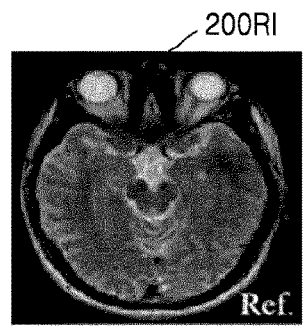
FIG. 9C illustrates an original MR image to be reconstructed by using a method of processing an MR image according to an exemplary embodiment.

FIG. 9A illustrates MR images 200R-1 through 200R-3 reconstructed by using a method of processing an MR image according to an exemplary embodiment. FIG. 9B illustrates MR images 200PI-1 through 200PI-3 reconstructed by using a parallel imaging method. FIG. 9C illustrates an original MR image 200RI obtained by fully sampling k-space data.

Referring to FIG. 9A, when a first reconstructed MR image 200R-1 is accelerated at an acceleration factor of R=3, the first reconstructed MR image 200R-1 may be an image reconstructed by using the methods according to the exemplary embodiments shown in FIGS. 2 through 7. In one exemplary embodiment, the first reconstructed MR image 200R-1 may be an image reconstructed by using a plurality of MR images subsampled at an acceleration factor of R=3 and a noise pattern map with an acceleration factor of R=3 as an input to the ANN model (e.g., 200A of FIG. 4A) and providing the original MR image 200RI as an output. When second and third reconstructed MR images 200R-2 and 200R-3 are accelerated at acceleration factors of R=4 and R=5, respectively, the second and third reconstructed MR images 200R-2 and 200R-3 may be obtained by using the same method as that for the first reconstructed MR image 200R-1.

Upon comparing the first through third reconstructed MR images 200R-1 through 200R-3 shown in FIG. 9A with first through third reconstructed MR images 200PI-1 through 200PI-3 shown in FIG. 9B, it can be seen that they are only slightly different from each other in terms of image quality. In a method according to an exemplary embodiment, a plurality of accelerated MR images having multiple contrasts may be reconstructed by applying them to an ANN model. The method may shorten the image acquisition time while maintaining the quality of a reconstructed MR image with almost no difference, compared to image acquisition using a parallel imaging method such as SENSE or GRAPPA.

Figure 10:
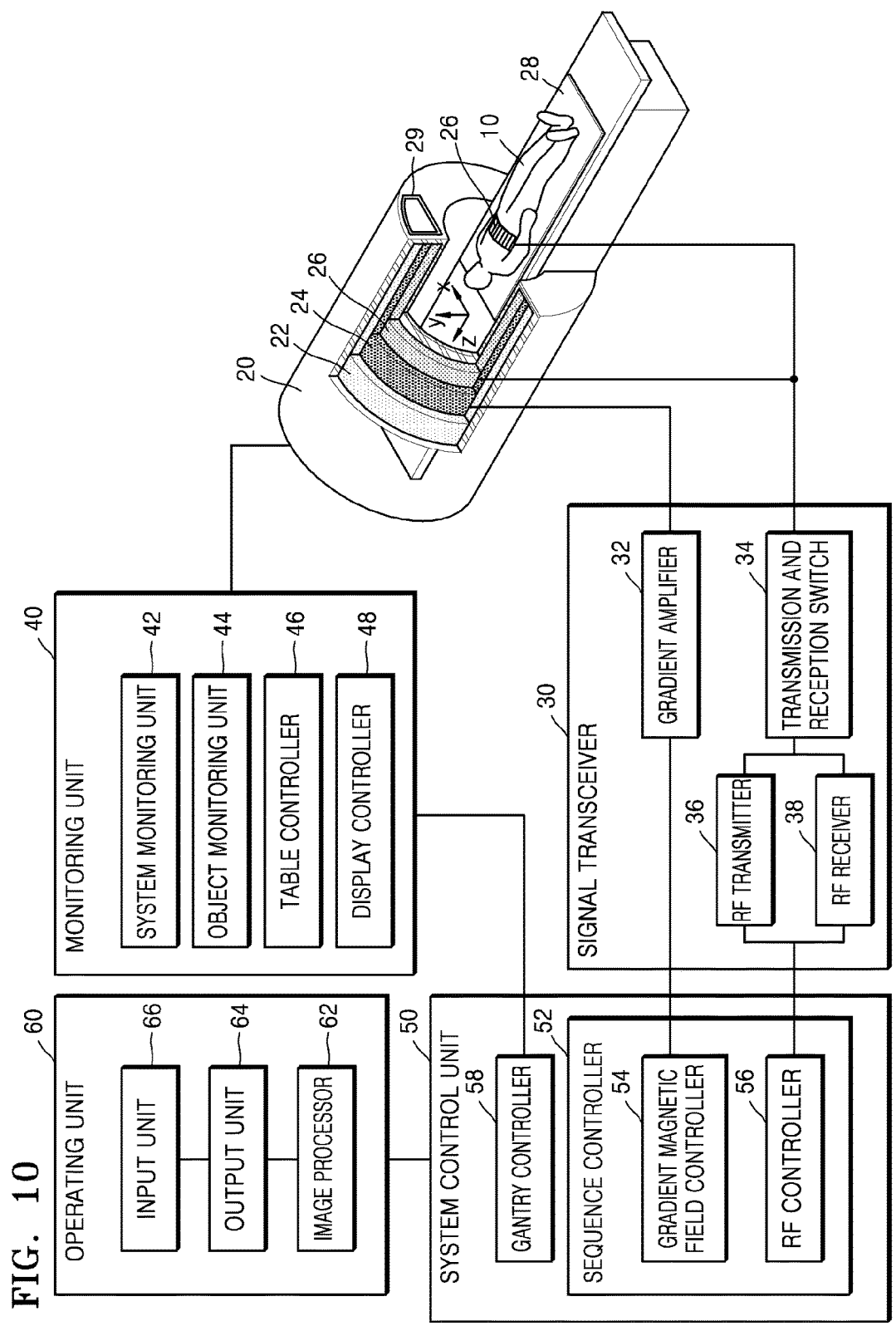
FIG. 10 is a schematic diagram of a general MRI system.

FIG. 10 is a block diagram of a general MRI system. Referring to FIG. 10, the general MRI system may include a gantry 20, a signal transceiver 30, a monitoring unit (also referred to herein as a "monitor") 40, a system control unit (also referred to herein as a "system controller") 50, and an operating unit (also referred to herein as an "operator") 60.

The gantry 20 prevents external emission of electromagnetic waves generated by a main magnet 22, a gradient coil 24, and an RF coil 26. A magnetostatic field and a gradient magnetic field are formed in a bore in the gantry 20, and an RF signal is emitted toward an object 10.

The main magnet 22, the gradient coil 24, and the RF coil 26 may be arranged in a predetermined direction of the gantry 20. The predetermined direction may be a coaxial cylinder direction. The object 10 may be disposed on a table 28 that is capable of being inserted into a cylinder along a horizontal axis of the cylinder.

The main magnet 22 generates a magnetostatic field or a static magnetic field for aligning magnetic dipole moments of atomic nuclei of the object 10 in a constant direction. A precise and accurate MR image of the object 10 may be obtained due to a magnetic field generated by the main magnet 22 being strong and uniform.

The gradient coil 24 includes X, Y, and Z coils for generating gradient magnetic fields in X-axis, Y-axis, and Z-axis directions which cross each other at right angles. The gradient coil 24 may provide location information of each region of the object 10 by variably inducing resonance frequencies according to the regions of the object 10.

The RF coil 26 may emit an RF signal toward a patient and receive a magnetic resonance (MR) signal emitted from the patient. In detail, the RF coil 26 may transmit, toward atomic nuclei included in the patient and having precessional motion, an RF signal having the same frequency as that of the precessional motion, stop transmitting the RF signal, and then receive an MR signal emitted from the atomic nuclei included in the patient.

For example, in order to transit an atomic nucleus from a low energy state to a high energy state, the RF coil 26 may generate and apply an electromagnetic wave signal that is an RF signal corresponding to a type of the atomic nucleus, to the object 10. When the electromagnetic wave signal generated by the RF coil 26 is applied to the atomic nucleus, the atomic nucleus may transit from the low energy state to the high energy state. Then, when electromagnetic waves generated by the RF coil 26 disappear, the atomic nucleus to which the electromagnetic waves were applied transits from the high energy state to the low energy state, thereby emitting electromagnetic waves having a Larmor frequency. In this aspect, when the applying of the electromagnetic wave signal to the atomic nucleus is stopped, an energy level of the atomic nucleus is changed from a high energy level to a low energy level, and thus the atomic nucleus may emit electromagnetic waves having a Larmor frequency. The RF coil 26 may receive electromagnetic wave signals from atomic nuclei included in the object 10.

The RF coil 26 may be realized as one RF transmitting and receiving coil that has both a function of generating electromagnetic waves, each having an RF that corresponds to a type of an atomic nucleus, and a function of receiving electromagnetic waves emitted from an atomic nucleus. Alternatively, the RF coil 26 may be realized as a transmission RF coil that has a function of generating electromagnetic waves, each having an RF that corresponds to a type of an atomic nucleus, and a reception RF coil that has a function of receiving electromagnetic waves emitted from an atomic nucleus.

The RF coil 26 may be fixed to the gantry 20 or may be detachable. When the RF coil 26 is detachable, the RF coil 26 may be an RF coil for a part of the object, such as a head RF coil, a chest RF coil, a leg RF coil, a neck RF coil, a shoulder RF coil, a wrist RF coil, or an ankle RF coil.

The RF coil 26 may communicate with an external apparatus via wires and/or wirelessly, and may also perform dual tune communication according to a communication frequency band.

The RF coil 26 may be a transmission exclusive coil, a reception exclusive coil, or a transmission and reception coil according to methods of transmitting and receiving an RF signal.

The RF coil 26 may be an RF coil having various numbers of channels, such as 16 channels, 32 channels, 72 channels, and 144 channels.

The gantry 20 may further include a display 29 disposed outside the gantry 20 and a display (not shown) disposed inside the gantry 20. The gantry 20 may provide predetermined information to the user or the object 10 through the display 29 and the display respectively disposed outside and inside the gantry 20.

The signal transceiver 30 may control the gradient magnetic field formed inside the gantry 20, i.e., in the bore, according to a predetermined MR sequence, and control transmission and reception of an RF signal and an MR signal.

The signal transceiver 30 may include a gradient amplifier 32, a transmission and reception switch 34, an RF transmitter 36, and an RF receiver 38.

The gradient amplifier 32 drives the gradient coil 24 included in the gantry 20, and may supply a pulse signal for generating a gradient magnetic field to the gradient coil 24 under the control of a gradient magnetic field controller 54. By controlling the pulse signal supplied from the gradient amplifier 32 to the gradient coil 24, gradient magnetic fields in X-axis, Y-axis, and Z-axis directions may be synthesized.

The RF transmitter 36 and the RF receiver 38 may drive the RF coil 26. The RF transmitter 36 may supply an RF pulse in a Larmor frequency to the RF coil 26, and the RF receiver 38 may receive an MR signal received by the RF coil 26.

The transmission and reception switch 34 may adjust transmitting and receiving directions of the RF signal and the MR signal. For example, the transmission and reception switch 34 may emit the RF signal toward the object 10 through the RF coil 26 during a transmission mode, and receive the MR signal from the object 10 through the RF coil 26 during a reception mode. The transmission and reception switch 34 may be controlled by a control signal output by an RF controller 56.

The monitoring unit 40 may monitor or control the gantry 20 or devices mounted on the gantry 20. The monitoring unit 40 may include a system monitoring unit (also referred to herein as a "system monitor") 42, an object monitoring unit (also referred to herein as an "object monitor") 44, a table controller 46, and a display controller 48.

The system monitoring unit 42 may monitor and control a state of the magnetostatic field, a state of the gradient magnetic field, a state of the RF signal, a state of the RF coil 26, a state of the table 28, a state of a device measuring body information of the object 10, a power supply state, a state of a thermal exchanger, and a state of a compressor.

The object monitoring unit 44 monitors a state of the object 10. In detail, the object monitoring unit 44 may include any of a camera for observing a movement or position of the object 10, a respiration measurer for measuring the respiration of the object 10, an electrocardiogram (ECG) measurer for measuring the electrical activity of the object 10, and/or a temperature measurer for measuring a temperature of the object 10.

The table controller 46 controls a movement of the table 28 where the object 10 is positioned. The table controller 46 may control the movement of the table 28 according to a sequence control of a system controller 50. For example, during moving imaging of the object 10, the table controller 46 may continuously or discontinuously move the table 28 according to the sequence control of the system controller 50, and thus the object 10 may be photographed in a field of view (FOV) which is larger than that of the gantry 20.

The display controller 48 controls the display 29 disposed outside the gantry 20 and the internal display disposed inside the gantry 20. In detail, the display controller 48 may control the display 29 and the internal display to be on or off, and may control a screen image to be output on the display 29 and the display. Also, when a speaker is located inside or outside the gantry 20, the display controller 48 may control the speaker to be on or off, or may control sound to be output via the speaker.

The system control unit 50 may include the sequence controller 52 for controlling a sequence of signals formed in the gantry 20, and a gantry controller 58 for controlling the gantry 20 and the devices mounted on the gantry 20.

The sequence controller 52 may include the gradient magnetic field controller 54 for controlling the gradient amplifier 32, and the RF controller 56 for controlling the RF transmitter 36, the RF receiver 38, and the transmission and reception switch 34. The sequence controller 52 may control the gradient amplifier 32, the RF transmitter 36, the RF receiver 38, and the transmission and reception switch 34 according to a pulse sequence received from the operating unit 60. Here, the pulse sequence includes all information required to control the gradient amplifier 32, the RF transmitter 36, the RF receiver 38, and the transmission and reception switch 34. For example, the pulse sequence may include information about a strength, an application time, and application timing of a pulse signal applied to the gradient coil 24.

The operating unit 60 may request the system control unit 50 to transmit pulse sequence information while controlling an overall operation of the MRI system.

The operating unit 60 may include an image processor 62 for receiving and processing the MR signal received by the RF receiver 38, an output unit 64, and an input unit 66.

The image processor 62 may process the MR signal received from the RF receiver 38 so as to generate MR image data of the object 10.

The image processor 62 receives the MR signal received by the RF receiver 38 and performs any one of various signal processes, such as amplification, frequency transformation, phase detection, low frequency amplification, and filtering, on the received MR signal.

The image processor 62 may arrange digital data in a k space (for example, also referred to as a Fourier space or a frequency space) of a memory, and rearrange the digital data into image data via 2D or 3D Fourier transformation.

If needed, the image processor 62 may perform a composition process or difference calculation process on the image data. The composition process may include an addition process on a pixel or a maximum intensity projection (MIP) process. The image processor 62 may store not only the rearranged image data but also image data on which a composition process or a difference calculation process is performed, in a memory (not shown) or an external server.

The image processor 62 may perform any of the signal processes on the MR signal in parallel. For example, the image processor 62 may perform a signal process on a plurality of MR signals received by a multi-channel RF coil in parallel so as to rearrange the plurality of MR signals into image data.

The output unit 64 may output image data generated or rearranged by the image processor 62 to the user. The output unit 64 may also output information required for the user to manipulate the MRI system, such as a user interface (UI), user information, and/or object information.

The user may input object information, parameter information, a scan condition, a pulse sequence, or information about image composition or difference calculation by using the input unit 66. The input unit 66 may include any of a keyboard, a mouse, a track ball, a voice recognizer, a gesture recognizer, a touch screen, and/or any one of other various input devices that are well known to one of ordinary skill in the art.

The signal transceiver 30, the monitoring unit 40, the system control unit 50, and the operating unit 60 are separate components in FIG. 10, but it will be apparent to one of ordinary skill in the art that respective functions of the signal transceiver 30, the monitoring unit 40, the system control unit 50, and the operating unit 60 may be performed by another component. For example, the image processor 62 converts the MR signal received from the RF receiver 38 into a digital signal in FIG. 1, but alternatively, the conversion of the MR signal into the digital signal may be performed by the RF receiver 38 or the RF coil 26.

The gantry 20, the RF coil 26, the signal transceiver 30, the monitoring unit 40, the system control unit 50, and the operating unit 60 may be connected to each other by wire or wirelessly, and when they are connected wirelessly, the MRI system may further include an apparatus (not shown) for synchronizing clock signals therebetween. Communication between the gantry 20, the RF coil 26, the signal transceiver 30, the monitoring unit 40, the system control unit 50, and the operating unit 60 may be performed by using a high-speed digital interface, such as low voltage differential signaling (LVDS), asynchronous serial communication, such as a universal asynchronous receiver transmitter (UART), a low-delay network protocol, such as error synchronous serial communication or a controller area network (CAN), optical communication, or any of other various communication methods that are well known to one of ordinary skill in the art.

Figure 11:
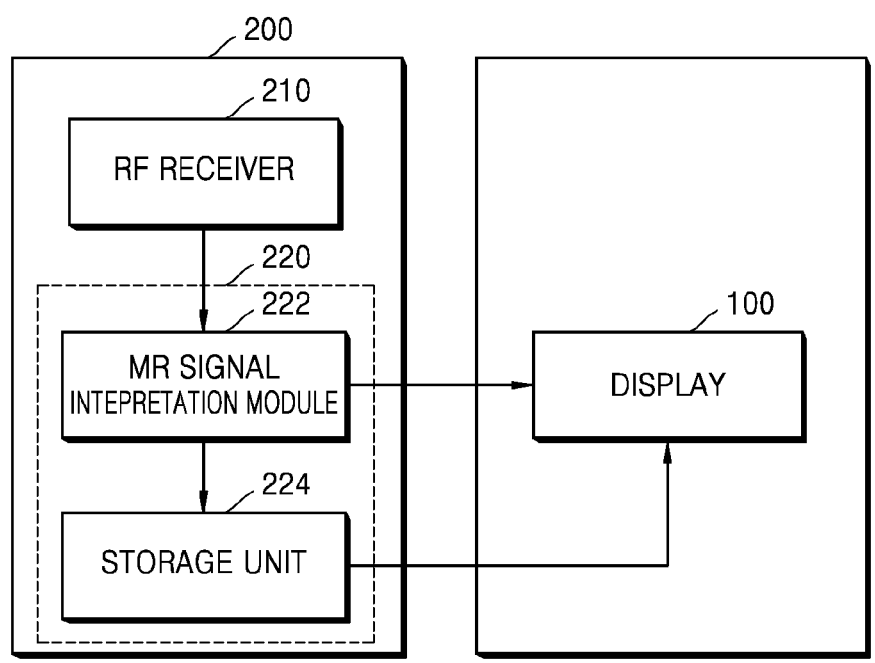
FIG. 11 is a block diagram of an MRI apparatus according to an exemplary embodiment.

FIG. 11 is a block diagram of an MRI apparatus 1000 according to an exemplary embodiment.

Referring to FIG. 11, the MRI apparatus 1000 may include a display 100 and an image processor 200. The image processor 200 may include an RF receiver 210 and an MR image processing module 220. The MR image processing module 220 may include an MR signal interpretation module 222 and a storage unit 224. The MRI apparatus 1000 may be a modification example of the MRI system of FIG. 1 implemented according to an exemplary embodiment, or may include only a part of the MRI system of FIG. 10. Thus, the RF receiver 210 and the image processor 200 of the MRI apparatus 1000 may respectively correspond to the RF receiver 38 and the image processor 62 described with reference to FIG. 10. According to an exemplary embodiment, the image processor 200 may be composed of hardware components such as FPGAs or ASICs.

The RF coil (26 of FIG. 10) of the gantry (20 of FIG. 10) may receive an MR signal emitted from an object. According to an exemplary embodiment, the RF coil 26 may be formed as at least one coil, and the at least one RF coil 26 may receive an MR signal emitted from the same part of the object. The RF receiver 210 may acquire an MR signal received by the at least one RF coil.

The image processor 200 may generate a plurality of MR images that have different contrasts with respect to the same part of the object by accelerating the MR signal received by the RF receiver 210 and reconstruct an MR image by applying an ANN model. The reconstructed MR image may have a different contrast than those of the plurality of MR images and an original MR image, but is not limited thereto.

As described above, the MR signal processing module 220 may include the MR signal interpretation module 222 and the storage unit 224. The MR signal processing module 220 may obtain a plurality of MR images by subsampling k-space data having different contrasts an original MR image by fully sampling the k-space data. According to an exemplary embodiment, the MR signal interpretation module 222 may arrange digital data in a k space and rearrange the digital data into image data via 2D or 3D Fourier transformation. The MR signal interpretation module 222 may determine a correlation between a plurality of sub-data sets by using a parallel imaging method and obtain a plurality of MR images.

The MR signal interpretation module 222 may generate a reconstructed image by using an ANN model that uses a plurality of MR images obtained by subsampling k-space data as an input and provides an original MR image as an output. According to an exemplary embodiment, the MR signal interpretation module 222 may extract patches, each of which is a set of pixels, respectively from the plurality of MR images and the original MR image and apply the patches to the ANN model. For example, each patch may be a set of 5 by 5 (5×5) pixels. According to an exemplary embodiment, the MR signal interpretation module 222 may use an MLP algorithm as an ANN model to learn a correlation between the plurality of MR images and the original MR image. According to an exemplary embodiment, the MR signal interpretation module 222 may determine a correspondence relation between the patches respectively extracted from the plurality of MR images and the original MR image and learn a correlation between corresponding patches by applying the MLP algorithm based on the determined correspondence relation. According to an exemplary embodiment, the MR signal interpretation module 222 may learn a correlation between the plurality of MR images and the original MR image by using a backpropagation method.

According to an exemplary embodiment, the MR signal interpretation module 222 may acquire information about a noise pattern map related to a g-factor of the RF coil 26 by using SENSE. The MR signal interpretation module 222 may use the noise pattern map as an input to the ANN model in order to learn a correlation between the accelerated plurality of MR images that have multiple contrasts and obtained by accelerating and the original MR image.

According to an exemplary embodiment, the MR signal interpretation module 222 may obtain a non-accelerated full-sampling image with respect to the same part of an object. Furthermore, the MR signal interpretation module 222 may use the full-sampling image as an input to the ANN model in order to learn a correlation between an accelerated plurality of MR images that have multiple contrasts and an original MR image.

According to an exemplary embodiment, the MR signal interpretation module 222 may be a processor configured to extract pixels or patches from each of a plurality of MR images and having the ability to perform arithmetic operations to quantify brightness, color information, and/or contrast rate for each of the extracted pixels or patches. For example, the MR signal interpretation module 222 may be one hardware device from among a central processing unit (CPU), a microprocessor, and a graphic processing unit.

The storage unit 224 may store the plurality of MR images and the original MR image obtained by the MR signal interpretation module 222. Furthermore, the storage unit 224 may store an MR image reconstructed by the MR signal interpretation module 222 using the ANN model. The storage unit 224 may include at least one of a volatile memory (e.g., dynamic RAM (DRAM), static RAM (SRAM), synchronous dynamic RAM (SDRAM), etc.), a non-volatile memory (e.g., one time programmable ROM (OTPROM), programmable ROM (PROM), erasable and programmable ROM (EPROM), electrically erasable and programmable ROM (EEPROM), mask ROM, flash ROM, etc.), a hard disk drive (HDD), and a solid state drive (SSD). According to an exemplary embodiment, the storage unit 224 may include one of a database and DICOM.

The display 100 may display MR images generated or reconstructed by the image processor 200 to the user. Furthermore, the display 100 may output UIs as well as information necessary for the user to manipulate the MRI apparatus 1000, such as user information or object information. The display 100 may include at least one of a cathode-ray tube (CRT) display, a liquid crystal display (LCD), a plasma display panel (PDP), an organic light-emitting diode (OLED) display, a field emission display (FED), a light-emitting diode (LED) display, a vacuum fluorescent display (VFD), a digital light processing (DLP) display, a flat panel display (FPD), a 3D display, and a transparent display.

The exemplary embodiments of the present inventive concept may be written as computer programs and may be implemented in general-use digital computers that execute the programs using a non-transitory computer-readable recording medium.

Examples of the non-transitory computer-readable recording medium include magnetic storage media (e.g., ROM, floppy disks, hard disks, etc.), optical recording media (e.g., CD-ROMs or DVDs), etc.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims. Accordingly, the above exemplary embodiments and all aspects thereof are examples only and are not limiting.

What is claimed is:

1. A method for reconstructing a plurality of magnetic resonance (MR) images, the method comprising:
   generating a plurality of MR images that have different contrasts with respect to a first part of an object;
   using the plurality of MR images as an input to an artificial neural network (ANN) model in order to reconstruct an original MR image, and determining a correlation between each of the plurality of MR images and the reconstructed original MR image;
   reconstructing an MR image based on the generated plurality of MR images and the determined correlation via the ANN model; and
   displaying the reconstructed MR image,
   wherein the original MR image is obtained by fully sampling multi-contrast k-space data with respect to the first part of the object, and
   wherein the determining of the correlation comprises:
      extracting a plurality of first patches that includes a set of a plurality of pixels from each of the generated plurality of MR images used as the input to the ANN model;
      extracting a plurality of second patches from the original MR image used as an output to the ANN model;
      determining a correspondence relation between the plurality of first patches and the plurality of second patches; and
      determining the correlation based on the determined correspondence relation.

2. The method of claim 1, wherein the generating the plurality of MR images comprises generating the plurality of MR images by subsampling an MR signal acquired from the first part of the object and using a parallel imaging method with respect to a result of the subsampling.

3. A non-transitory computer-readable recording medium having recorded thereon a program for executing the method of claim 1 on a computer.

4. The method of claim 1, wherein the determining the correlation comprises applying a Multi-layer Perceptron (MLP) to each of the generated plurality of MR images and the original MR image.

5. The method of claim 1, wherein the determining the correlation comprises using a backpropagation method.

6. The method of claim 1, further comprising acquiring noise pattern information that relates to a geometric factor of a radio frequency (RF) coil by using a parallel imaging method,
   wherein the determining the correlation comprises using the noise pattern information as an input to the ANN model.

7. The method of claim 1, wherein the determining the correlation comprises classifying each of the generated plurality of MR images and the original MR image into a magnitude image and a phase image and determining a correlation with respect to the magnitude image and the phase image.

8. The method of claim 1, further comprising generating an MR image that has a different contrast than the contrasts of the generated plurality of MR images based on the determined correlation between the generated plurality of MR images and the original MR image.

9. A magnetic resonance imaging (MRI) apparatus, the apparatus comprising:
   at least one radio frequency (RF) channel coil configured to receive an MR signal emitted from a first part of an object;
   an RF receiver configured to acquire the MR signal;
   an image processor configured to:
      generate a plurality of MR images that have different respective contrasts with respect to the first part of the object;
      use the generated plurality of MR images as an input to an artificial neural network (ANN) model in order to reconstruct an original MR image;
      determine a correlation between each of the generated plurality of MR images and the original MR image; and reconstruct an MR image based on the determined correlation; and
a display configured to display the reconstructed MR image,
wherein the original MR image is obtained by fully sampling multi-contrast k-space data with respect to the first part of the object, and
wherein the image processor is further configured to:
  extract a plurality of first patches that includes a set of a plurality of pixels from each of the generated plurality of MR images used as the input to the ANN model;
  extract a plurality of second patches from the original MR image used as an output to the ANN model;
  determine a correspondence relation among the plurality of first patches and the plurality of second patches; and
  determine the correlation based on the determined correspondence relation.

10. The apparatus of claim 9, wherein the image processor is further configured to generate an MR image that has a different contrast than the contrasts of the plurality of MR images based on the determined correlation between the generated plurality of MR images and the original MR image.

11. The apparatus of claim 9, wherein the image processor comprises:
  an MR signal interpretation module configured to determine the correlation and to reconstruct the MR image; and
  a memory configured to store the generated plurality of MR images, the original MR image, and the reconstructed MR image.

12. The apparatus of claim 9, wherein the image processor is further configured to generate the plurality of MR images by subsampling the MR signal received by the RF receiver and by using a parallel imaging method with respect to a result of the subsampling.

13. The apparatus of claim 9, wherein the image processor is further configured to determine the correlation between the generated plurality of MR images and the original MR image by using a backpropagation method.

14. The apparatus of claim 9, wherein the image processor is further configured to determine the correlation between the generated plurality of MR images and the original MR image by applying a Multi-layer Perceptron (MLP) to each of the generated plurality of MR images and the original MR image.

15. The apparatus of claim 9, wherein the image processor is further configured to acquire noise pattern information that relates to a geometric factor of the at least one RF channel coil by using a parallel imaging method.

16. The apparatus of claim 15, wherein the image processor is further configured to determine the correlation between the generated plurality of MR images and the original MR image by using the noise pattern information as an input to the ANN model.

* * * * *